United States Patent [19]

Howerton et al.

[11] 4,185,447
[45] Jan. 29, 1980

[54] HAY CONVEYING BELT AND HAY RAKE

[75] Inventors: Anderson W. Howerton; Lee R. Burris, both of Nixa, Mo.

[73] Assignee: Dayco Corporation, Dayton, Ohio

[21] Appl. No.: 900,677

[22] Filed: Apr. 27, 1978

[51] Int. Cl.² .......................................... A01D 43/02
[52] U.S. Cl. ................................... 56/376; 56/179; 56/290; 198/844
[58] Field of Search .............. 56/49, 376, 154, 290, 56/291, 292, 400, 177, 179; 74/233, 234; 198/844; 172/100

[56] References Cited

U.S. PATENT DOCUMENTS

| 395,132 | 12/1888 | Graham | 56/376 |
| 1,406,506 | 2/1922 | Stansberry | 56/376 |
| 2,478,282 | 8/1949 | Kyker | 56/400 |
| 2,511,100 | 6/1950 | Clark | 56/376 |
| 2,867,069 | 1/1959 | Ellis | 56/291 |
| 2,989,835 | 6/1961 | Johnston | 56/400 |
| 3,397,524 | 8/1968 | Hofer | 56/290 |
| 3,473,989 | 10/1969 | Richmond | 74/233 |
| 3,545,188 | 12/1970 | Locati | 56/292 |
| 3,830,113 | 8/1974 | Bruns | 74/233 |
| 3,834,138 | 9/1974 | Gibson | 56/290 |
| 3,896,611 | 7/1975 | Lingenfelter | 56/291 |
| 3,981,390 | 9/1976 | Richard | 198/698 |
| 3,987,684 | 10/1976 | Fisher et al. | 74/233 |
| 3,995,507 | 12/1976 | White et al. | 74/233 |
| 4,023,671 | 5/1977 | Kramer | 198/844 |

Primary Examiner—Louis G. Mancene
Assistant Examiner—Paul J. Hirsch
Attorney, Agent, or Firm—Charles E. Bricker

[57] ABSTRACT

A combination hay conveying belt and working element is provided which comprises a belt made primarily of elastomeric material and having an inner compression section, a load-carrying section and an outer tension section, the tension section having grooves disposed transverse to the endless path of the belt, and a working element attached exteriorly to the belt within each groove by means substantially conforming to at least a portion of the groove. Also provided is a hay or vegetation gathering apparatus which employs at least one of the above belts in combination with the working elements so that the belts travel parallel to the ground and the working elements extend perpendicular to the ground.

15 Claims, 5 Drawing Figures

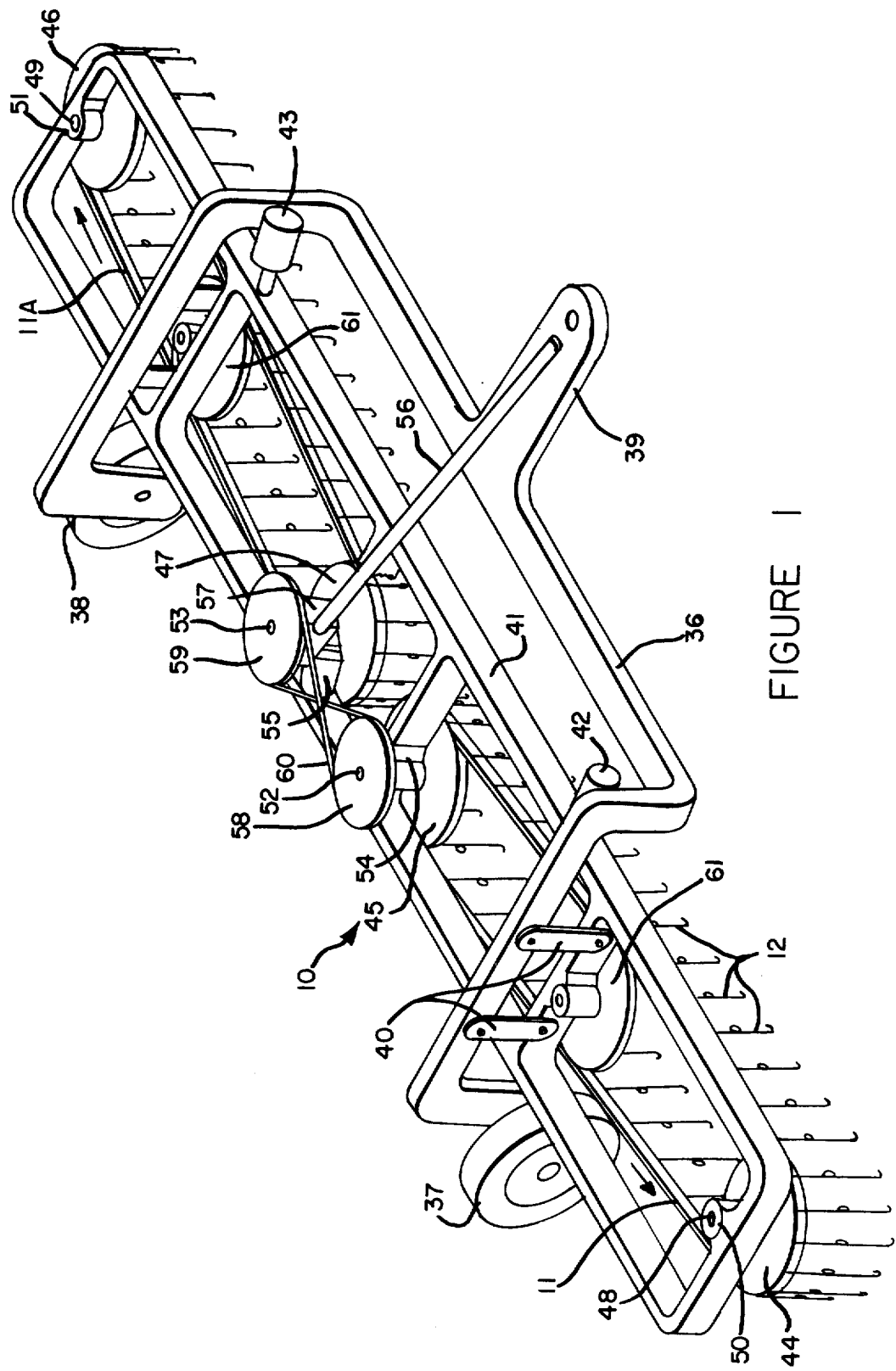

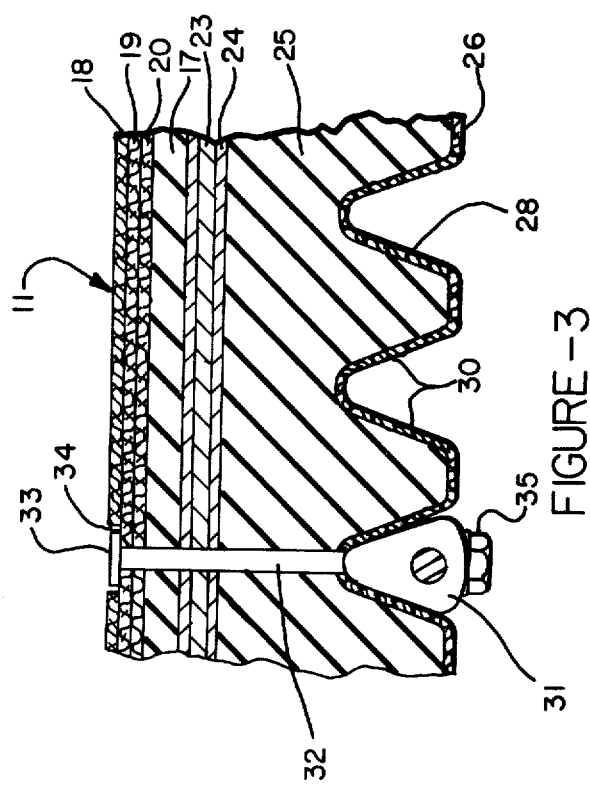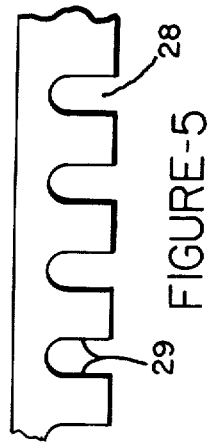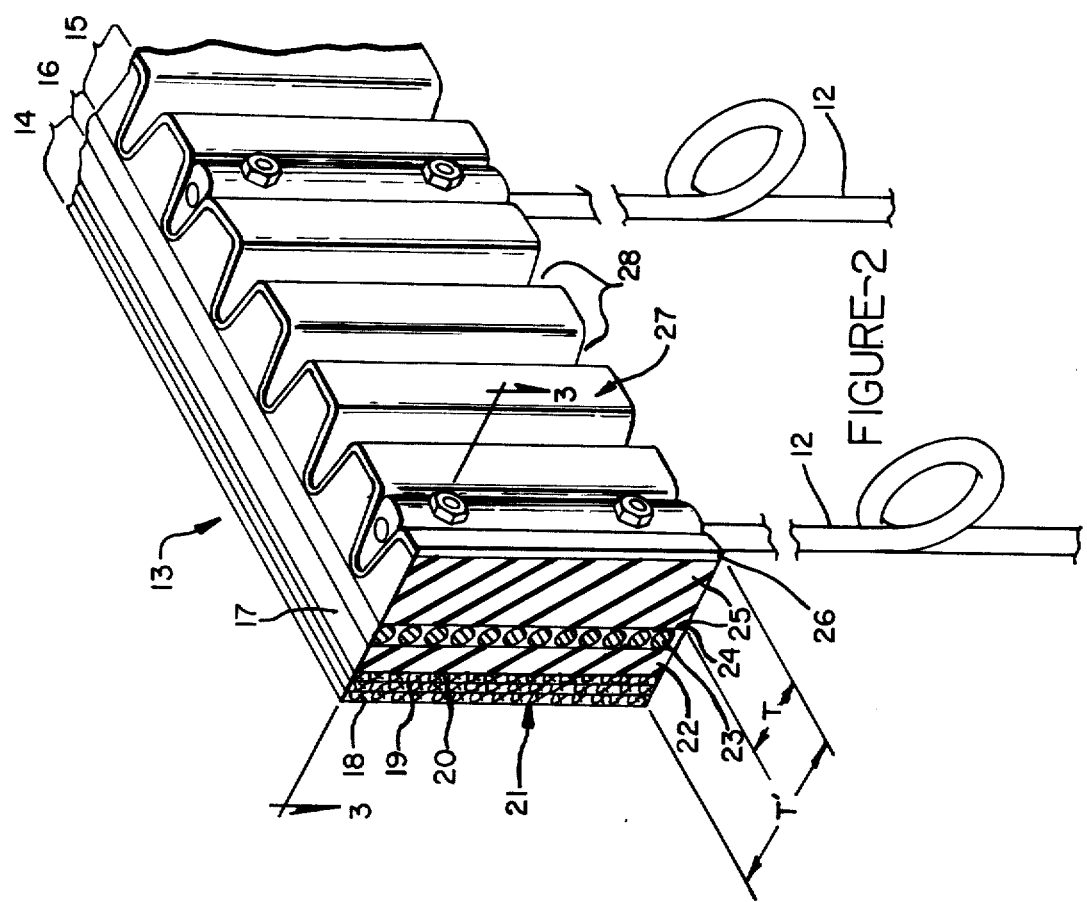

HAY CONVEYING BELT AND HAY RAKE

BACKGROUND OF THE INVENTION

The present invention relates to agricultural machinery such as hay or vegetation windrowing machinery, and to a conveying belt having at least one working element attached exteriorly thereto for this purpose.

In agricultural machinery, it is sometimes advantageous to use power transmission belts for performing work in addition to their normal function of power transmission. One or more working elements, such as a crop cutter or crop gatherer, may be attached to the exterior of the belt. Examples of such devices appear in U.S. Pat. Nos. 2,305,044; 2,637,436; 2,728,181; 2,782,582; 2,867,069; 3,397,524; 3,545,188; 3,641,751; 3,651,626; 3,699,757; 3,831,358; 3,853,016; 3,896,611; 3,981,390; and 4,030,276. While such belts offer many advantages, they are not free of problems. Belts with cutters are driven at high speeds up to about 12,000 feet per minute to effect impact cutting, while belts with crop engaging fingers are driven up to a few hundred feet per minute to effect crop conveying.

Long belt spans are required for agricultural cutters or conveyors. The long spans and attached working elements may cause the belt to vibrate longitudinally or torsionally at such a frequency as to cause instability which may cause the belt to disengage from its sheaves. The instability caused by a twisting force on a working element may be reduced by locating the enter of gravity of the working element over the belt center with connectors extending through or from the belt center. However, such solution to the problem of belt stability also introduces design limitation. The cutter or other working element is purposely not offset from the edge of the belt to space the plane of the sheaves away from the foliage being cut or gathered. Such a displacement, the art teaches, offsets the center of gravity of the working element causing belt twisting.

For slow speed belts the problem is especially acute because the working element is typically larger which, because of an increased moment arm, makes it easily deflectable. Attempts have been made to attach working elements to the outer periphery of power transmission belts to enable design of an orbiting belt wherein the working element is displaced from the belt center. For example, U.S. Pat. No. 4,030,276 discloses a power transmission belt having one or more working elements attached to the exterior thereof. A portion of the working element extends transversely across and is attached to the belt at two connecting portions spaced and aligned transversely in relation to the belt. As another example, U.S. Pat. No. 3,981,390 discloses a belt having at least one longitudinally oriented groove into which is positioned a rib that extends from a foot portion of a working element. A single fastener extends through the belt and a portion of the foot. The groove, rib and fastener cooperate with each other to resist the foot from pivoting around the fastener.

While these patents offer some partial solutions to the problem of belt stability, they do not offer total solutions, but rather introduce some design limitations. The latter belt, in particular, requires additional or special belt building steps.

Accordingly, it is an object of the present invention to provide a belt-working element combination which is simple in construction and with a minimum of parts.

Another element of the invention is to provide a belt-working element combination which allows the center of gravity of the working element to be offset from the belt center without introducing instability to the belt.

Yet another object of the invention is to provide a hay rake which employs the belt-working element combination of this invention by moving this element in a novel pattern.

Other objects, aspects and advantages of the invention will be apparent to those skilled in the art after reviewing the following detailed description, the attached drawings and the appended claims.

SUMMARY OF THE INVENTION

In accordance with the present invention there is provided an improved belt-working element combination comprising an endless belt having at least one transverse groove on the outer surface thereof, at least one working element, a first means for attaching the working element exteriorly to the belt, and a second means for fastening the first means to the belt.

There is also provided a hay rake comprising at least one of the above-described combination belt and working element and moving in a path parallel to the ground while the working element extends perpendicular to the ground.

BRIEF DESCRIPTION OF THE DRAWINGS

The invention will be more completely understood by reference to the accompanying drawings where like elements are denoted by the same reference numerals, in which:

FIG. 1 is a perspective view of a hay raking apparatus having converging gathering belts constructed according to the invention;

FIG. 2 is a perspective view showing a portion of a belt section having a protruding rake tooth and means for attaching the tooth to the belt;

FIG. 3 is an elevational partial sectional view taken along section 3—3 of FIG. 2; and FIGS. 4 and 5 show alternate notch shapes.

DESCRIPTION OF THE PREFERRED EMBODIMENTS

Referring now to the drawings, and first to FIG. 1, a hay rake 10 is shown which may be used to windrow cut hay prior to baling the hay. The rake 10 comprises a pair of oppositely traversing raking belt assemblies 11 and 11A, to be described in greater detail below, which rake the hay toward the center of the rake 10.

Each of the belt assemblies 11 and 11A carries a plurality of spaced working members in the form of gathering tines or teeth 12 which extend perpendicular to the ground to carry the hay toward the center of the rake 10. The belt assembly 11, shown in FIG. 2 is comprised of a polymeric belt 13 of any suitable rubber or rubber-like material. For purposes of this invention, the belt 13 may be made of any suitable construction, even solid rubber. However, best results have been obtained with a belt constructed according to standard V-belt technology, as set forth below. The belt 13 shown herein comprises an inner compression section 14, an outer tension section 15 and a load-carrying section 16 therebetween. The belt 13 is the type commonly referrred to in the art as a "flat belt", which in this context means that it has parallel opposing sides. This type of belt is presently preferred, although it will be recognized by those skilled in the art that other types such as symmetric and asymmetric V-belts, multiple V-belts, and V-ribbed belts can also be used. By "V-belts" we mean belts having nonparallel sides, hence forming a wedge or truncated vee when viewed in cross-section.

The compression section 14 of the belt 13 is comprised of a plurality of layers including a layer 17 of elastomeric material and at least one fabric layer. In the exemplary embodiment shown in FIG. 2, the compression section 14 comprises three fabric layers 18, 19, and 20 with layer 18 being remote from the load-carrying section 16, the fabric layer 18 having a surface which may be considered an exposed outer surface that defines the inside surface 21 of the belt 11. The fabric layer 20 is arranged adjoining the elastomeric layer 17 followed by the fabric layer 19 disposed against the layer 20 and the remote layer 18 disposed against the fabric layer 19.

In the presently preferred embodiment the elastomeric layer 17 has a plurality of randomly distributed fibers embedded therein; a representative few of such fibers have been designed by the same reference number 22. The fibers 22 allow longitudinal flexibility for the entire belt 11 as it moves along its endless path, yet provide transverse strength.

The fibers 22 may be made of any suitable material, such as, for example, nylon, cotton, polyester, rayon, and the like and blends or mixtures of these materials.

The fibers 22 are dispersed throughout the elastomeric material 17 which serves as a matrix for such fibers. The fibers 22 are dispersed substantially uniformly throughout the elastomeric material, yet are arranged in random fashion in a substantially infinite number of planes whereby the fiber-loaded layer 17 of the belt 13 is free of clearly defined shear planes parallel to the load-carrying section 16. Each fiber 22 is arranged substantially parallel to each other fiber 22 in the layer 17 and the layer 17 is arranged such that the direction of orientation of the fibers 22 is substantially at a 90° angle to the longitudinal dimension or axis of the belt; however, it will be appreciated that the fibers 22 may be arranged at other angles, as desired.

The load-carrying section 16 may be made of any suitable material or materials and in this example is comprised of a helically-wound load-carrying cord 23 which is embedded in an elastomeric matrix 24, such as neoprene rubber, to provide a cushion on opposite sides of and completely around the cord 23. The helically-wound load-carrying cord 23 may be made of any suitable material known in the art, and similarly the elastomeric matrix or cushion 24 may also be made of any suitable material which is compatible with the materials used to define the layer 17 and the tension section 15, as hereinafter defined, to assure a tenacious bond herebetween. It will also be appreciated that instead of providing a helically-wound load-carrying cord 23 any other suitable load-carrying means may be provided in the belt 13.

The tension section 15 of the belt is comprised of a plurality of layers including a layer 25 of elastomeric material and at least one fabric layer 26. The fabric layer 26 has a surface which may be considered an exposed outer surface that defines the outside surface 27 of the belt 13.

The tension section 15 preferably has a thickness T ranging from about 40% to about 80% of the total thickness T' of the belt 13, i.e., as measured between the inner surface 21 and the outer surface 27.

The tension section 15 is provided with a plurality of grooves 28 disposed substantially perpendicular to the longitudinal axis of the belt 13; that is, transverse to the endless path of the belt. The grooves 28 should extend into the body of the belt to a maximum depth of about 25 to about 80 percent of the thickness T of the tension section 15. The innermost portion of each groove 28 should have a generally arcuate configuration. For example, the grooves 28 can be of a semicircular configuration, as shown in FIG. 4; of an oblong configuration with the sides 29 parallel to each other, as shown in FIG. 5; or, as presently preferred, of a conical configuration with the sides 30 diverging outwardly as shown in FIG. 3. The grooves 28 may be equally spaced or randomly spaced to effect a pitch spacing which further increases belt stability by lessening the chance of harmonic reaction between the belt system and the supporting sheave system of machinery.

The elastomeric material comprising various components of the belt disclosed herein is shown in the drawing as being rubber. However, it is to be understood that any section of the illustrated belt or a plurality of sections of the belt may be made of any suitable elastomeric material, including synthetic plastic materials.

The belt 13 can be made by any procedure known in the art; for example, a belt sleeve can be made by sequentially assembling various layers of materials, curing the sleeve, and then cutting it to the finished products.

The connecting or attaching devices of the present invention include a rigid connector member 31 preferably formed of metal and having a shape to substantially fit the groove 28 when the belt assembly 11 is held straight, as when the belt assembly 11 is in the straight span between pulleys. The connector member 31 is attached to the belt assembly 11 by at least one, and preferably two, bolts 32, rivets or other fastening means. The bolt 32 has a flat head 33 which is recessed into the compression section 14 as shown at 34 in FIG. 3, in order to avoid contact between the head 33 and the pulleys about which the belt assembly 11 is disposed. The end of bolt 32 opposite end 33 is threaded for receipt of a threaded nut 35.

The rake tooth 12, or other working element, is attached to the connecting device 31 in suitable fashion, such as by welding.

Referring again to FIG. 1, the rake 10 comprises a frame 36 mounted upon wheels 37 and 38 and having a tongue 39 for hitching the rake 10 to a tractor or other means for pulling the rake. Mounted within the frame 36 by links 40 is a subframe 41 which supports the raking belt assemblies 11 and 11A as hereinafter described. A pair of actuating means, such as hydraulic cylinders 42 and 43, mounted at their one end to frame 36 and at their other end to subframe 41 are provided for the purpose of raising and lowering the subframe 41, thereby raising and lowering the tines 12 out of and into gathering or raking contact with the hay. This is accomplished by extending and retracting the pistons of the cylinders and utilizing the links 40 for this purpose.

The belt assembly 11 is mounted for rotation on sheaves 44 and 45, and the belt assembly 11A is mounted for rotation on sheaves 46 and 47. Sheaves 44 and 46 are suitably demountably fastened to shafts 48 and 49, respectively, which are supported by pillow blocks 50 and 51, respectively, which in turn are mounted to subframe 41. The pillow blocks 50 and 51 are preferably adjustable in order that the belt assemblies 11 and 11A can be adjusted as necessary. Sheaves 45 and 47 are suitably demountably fastened to shafts 52 and 53, respectively, which are supported by pillow blocks 54 and 55, respectively, which in turn are mounted to subframe 41. The pillow blocks 54 and 55 can be adjustable or fixed.

The pillow blocks 50, 51, 54, and 55 are inclined forward from the perpendicular position so that the leading rake tines, i.e., the tines at the front or nearest the leading or front portion of the apparatus, contact the hay to be gathered, while the trailing tines are lifted clear of the hay.

Power to move the belt assemblies 11 and 11A may be provided by the tractor through power take-off shaft 56, which is connected to the shaft 53 through a right angle gearbox 57. A pair of sheaves 58 and 59 are suitably demountably fastened to the upper ends of the shafts 52 and 53, respectively. Crossed belt 60 mounted upon sheaves 58 and 59 transfers power from the shaft 53 to shaft 52.

Due to the relatively long span of the belt assemblies, as for example between sheaves 44 and 45, it may be desirable to provide an additional supporting sheave 61. A similar supporting sheave 61 is provided between sheaves 46 and 47.

The pillow blocks 54 and 55 are mounted toward the rear of the subframe 41 and the pillow blocks 50 and 51 are mounted toward the front of the subframe 41. It can be seen that by this arrangement that as the apparatus travels in a given direction, the leading tines converge inwardly toward the center of the raking apparatus, opposite the direction of travel.

Safety guards which cover the moving belts and other components of the apparatus during operation of same have been omitted for the sake of brevity, but their configuration and placement will be readily apparent to those skilled in the art.

OPERATION OF THE APPARATUS

When the operator desires to gather the vegetation in his particular operation, such as forming loose hay into windrows, he will secure the tractor hitch to the apparatus by means of the tongue 39. At the same time, the power take-off shaft 56 is connected to the corresponding power outlet on the tractor. The apparatus is pulled forward on its wheels 37 and 38 and the shaft 56 is actuated to transmit power through gearbox 57 and shaft 53 to cause the shaft to rotate and the sheave 59 to rotate in a corresponding direction (clockwise). The crossed belt 60 causes sheave 58 and its shaft 52 to rotate in the opposite or counter-clockwise direction.

Rotation of the sheaves 58 and 59 causes corresponding rotation of lower sheaves 45 and 47, causing the belt assemblies 11 and 11A to be driven in a path or plane parallel to the ground around idler sheaves 44 and 46. Each belt moves in an opposite direction as shown by the arrows in FIG. 1. The working members or tines 12 which are part of the assembly will then move in a path corresponding to the path of each belt assembly to gather the loose vegetation and accumulate it toward the center of the apparatus, below and between the sheaves 45 and 47. Inasmuch as pillow blocks 54 and 55 (supporting sheaves 58 and 59) are mounted toward the rear of the apparatus, this creates an offset in a rearwardly direction with respect to the sheaves 44 and 46. As a result, the tines 12 will converge toward the center in a direction opposite the direction of travel of the apparatus as it is pulled forward.

It is contemplated that the belt-working element combination of the present invention may also be used in other conveying applications, not limited to agricultural applications, as well as for vegetation cutting through proper choice of the working element.

The present invention is capable of a variety of modifications which will become apparent to those skilled in the art, and which are considered to be within the scope of the following claims.

We claim:
1. The combination of a belt and a working element comprising
   (a) an endless belt made primarily of elastomeric material, having an inner compression section, a load-carrying section and an outer tension section, and having at least one groove in said outer tension section of said belt disposed transverse to the endless path of said belt, wherein the innermost portion of said groove has an arcuate configuration,
   (b) at least one working element,
   (c) a first means for attaching said working element exteriorly to said belt, wherein the portion of said first means contacting said groove substantially conforms to the configuration of said groove when said belt is straight, and
   (d) a second means for fastening said first means to said belt.
2. The combination of claim 1 wherein said working element is a rake tooth.
3. The combination of claim 1 wherein said belt is a flat belt.
4. The combination of claim 1 wherein said tension section has a thickness in the approximate range of 40 to 80 percent of the total thickness of said belt.
5. The combination of claim 1 wherein said groove has a conical configuration with the sides of said groove diverging outwardly.
6. The combination of claim 1 wherein the elastomeric material in said compression section has a plurality of randomly distributed fibers embedded therein.
7. The combination of claim 1 wherein said second means is recessed at one end thereof into said compression section.
8. The combination of claim 1 wherein said load-carrying section comprises a helically-wound load-carrying cord.
9. The combination of claim 1 wherein said compression section comprises a plurality of layers including a layer of elastomeric material and at least one fabric layer defining the inside surface of said belt, said elastomeric material having a plurality of fibers randomly dispersed therein; wherein said load-carrying section comprises a helically-wound load-carrying cord embedded in a gum-like elastomeric matrix; and wherein said tension section comprises a plurality of layers including a layer of elastomeric material and at least one fabric layer defining the outside surface of said belt.
10. A vegetation gathering apparatus comprising
   (a) a frame,
   (b) means supporting said frame above ground,
   (c) at least one pair of sheaves mounted upon said frame in a generally horizontal position,
   (d) a vegetation gathering belt assembly operationally associated with said sheaves and comprising
      i. an endless belt made primarily of elastomeric material having an inner compression section, a load-carrying section and an outer tension section, and having at least one groove in said outer tension section thereof disposed transverse to the endless path of said belt, wherein the innermost portion of said groove has an arcuate configuration, ii. at least one working element, iii. a first means for attaching said working element to said belt and extending said element perpendicular to the ground, wherein the portion of said first means contacting said groove substantially conforms to the configuration of said groove when said belt is straight, and iv. a second means for fastening said first means to said belt, and (e) means for rotating at least one of said sheaves, thereby imparting motion to said belt assembly parallel to the ground.

11. The apparatus of claim 10 wherein said working element is a hay raking tooth.

12. The apparatus of claim 10 further comprising means for raising and lowering said frame above ground level.

13. The apparatus of claim 10 having two pair of said sheaves and two of said vegetation gathering belt assemblies, wherein said rotating means is adapted to rotate said belt assemblies in opposite directions.

14. The apparatus of claim 13 wherein said sheaves are arranged upon said frame whereby the leading edges of said belts converge inwardly toward the center of said apparatus.

15. The apparatus of claim 14 wherein said sheaves are mounted upon said frame at an angle away from the horizontal position whereby the leading working elements contact the vegetation being gathered and the trailing working elements are lifted clear of said vegetation.

* * * * *